P. GIBBONS.
CORKS, &c.
No. 182,064.
Patented Sept. 12, 1876.
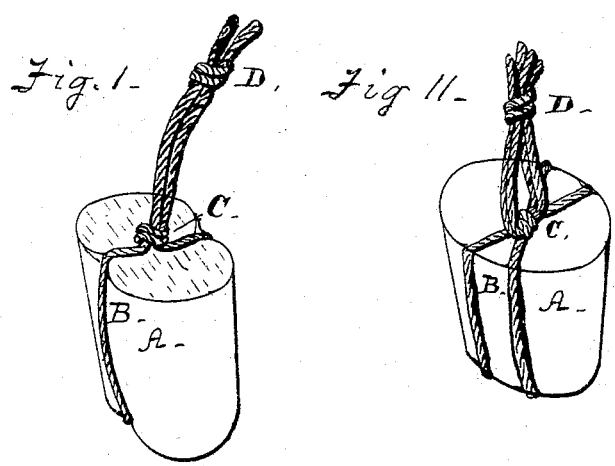
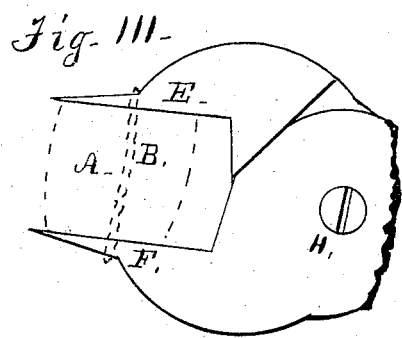
Witness:
F. M. Tate
Wm. J. Cochran
Inventor:
Patrick Gibbons.
By Saml. J. Wallace,
Attorney.

UNITED STATES PATENT OFFICE.

PATRICK GIBBONS, OF KEOKUK, IOWA.

IMPROVEMENT IN CORKS, &c.

Specification forming part of Letters Patent No. 182,064, dated September 12, 1876; application filed July 14, 1876.

*To all whom it may concern:*

Be it known that I, PATRICK GIBBONS, of Keokuk, Lee County, Iowa, have invented a new and useful Improvement in Corks, &c., which is made substantially as set forth hereinafter, referring to the accompanying drawings, in which—

Figure 1 shows the improved cork prepared for use. Fig. 2 shows the cork before compression. Fig. 3 is a tool for compressing the cork.

The object of this invention is to facilitate in extraction of corks from bottles, jugs, &c., without corkscrews, and to strengthen and preserve them; and it consists in features to this end hereinafter set forth.

The cork A, designed as a stopper for bottles, jugs, and other vessels, has the cord B tightly drawn around it across the grain of the fiber, and inclosing it from the bottom to the top, as shown. This cord is tied tightly at the top at C. The ends of the cord extend and are tied together at D. This cord holds the cork together, prevents its breaking, and serves to pull it out of its place. The cord is tied with two simple single knots, forming a loop for the cork. The cork is wet and compressed endwise between two jaws, E F. The loop is then put around it and over the jaws. The jaws are then released and their points drawn out of the loops. The jaws are made thin and tapered from a point over the middle of the cork, so as to draw out easily. The cork then expands and embeds the cord in itself. For fragile corks two cords are used, tied together under the bottom, and separated up the sides to hold better. Sometimes the cork has the cord tied around it.

In this case the cork is forced down over the cord into a tapering cavity into which it fits. The cord is then tied tightly on top, and the cork removed. A number of these holes are made in a metal frame, to be filled and tied by cheap labor.

I claim—

The cork with the inclosing cord tied tightly around it from bottom to top, across the fiber, and having its ends extending from the top, as an improved article of manufacture, for use substantially as set forth.

PATRICK GIBBONS.

Witnesses:
SAML. J. WALLACE,
F. STEVENS.